(12) United States Patent
Reitemann (10) Patent No.: US 10,760,594 B2
(45) Date of Patent: Sep. 1, 2020

(54) HYDRAULIC CYLINDER SUPPLY SYSTEM

(71) Applicant: AGCO International GmbH, Neuhausen (CH)

(72) Inventor: Gabriel Reitemann, Oy Mittelberg (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 16/411,519

(22) Filed: May 14, 2019

(65) Prior Publication Data

US 2019/0350119 A1    Nov. 21, 2019

(30) Foreign Application Priority Data

May 15, 2018 (GB) .................................. 1807828

(51) Int. Cl.

| | |
|---|---|
| *F15B 11/16* | (2006.01) |
| *F15B 11/22* | (2006.01) |
| *F15B 13/06* | (2006.01) |
| *A01B 63/22* | (2006.01) |
| *A01B 63/32* | (2006.01) |

(52) U.S. Cl.
CPC ............ *F15B 11/165* (2013.01); *F15B 11/22* (2013.01); *F15B 13/06* (2013.01); *A01B 63/22* (2013.01); *A01B 63/32* (2013.01)

(58) Field of Classification Search
CPC ......... F15B 11/165; F15B 11/20; F15B 11/22; F15B 13/06; F15B 13/07
See application file for complete search history.

(56) References Cited

U.S. PATENT DOCUMENTS

2017/0215329 A1    8/2017    Lacher et al.

FOREIGN PATENT DOCUMENTS

| | | |
|---|---|---|
| DE | 19913784 A1 | 9/2000 |
| EP | 2884118 A1 | 6/2015 |
| EP | 3321515 A1 | 5/2018 |

OTHER PUBLICATIONS

European Patent Office, Search Report for Related EP Application No. 19168961, dated Sep. 18, 2019.
UK Intellectual Property Office, Search Report for Priority Application No. GB1807828.7, dated Oct 31, 2018.

*Primary Examiner* — Michael Leslie (57) ABSTRACT

A hydraulic circuit provides relief pressure operation for a lift cylinder and/or top cylinder in an implement linkage of a utility vehicle. A relief pressure control valve has a first position providing a connection between a variable displacement pump and one side of the hydraulic cylinder, and a second position providing a connection between that side of the hydraulic cylinder and a drain or reservoir. A connection carries an indication of the pressure in the hydraulic cylinder chamber as a load-sensing signal to control adjustment of the pump.

12 Claims, 5 Drawing Sheets

HYDRAULIC CYLINDER SUPPLY SYSTEM

BACKGROUND

Field of Invention

The invention relates to a pressurised fluid supply system on an agricultural vehicle provided to supply hydraulic cylinders for example to move the top link and/or lower links of a tractor three-point-linkage. The pressurised fluid supply system being controllable to switch between having pressure control on the lower links of a linkage and the upper link or links for example the top link cylinder in a three point linkage.

Description of Related Art

Mobile fluid (hydraulic) supply systems are widely used to drive consumers on agricultural vehicles, such as tractors, or on implements attached thereto. The term "control" in relation to supply systems hereby includes any adjustment of the supply system regarding direction, supply time or pressure of the fluid flow. These hydraulic systems are mostly provided with a pump, one or more consumers, control means and a tank to provide a fluid reservoir.

Referring to an agricultural tractor, a well-known form of consumer fixedly installed on this machinery is a hydraulic cylinder used to raise or lower a lower arm of a three-point linkage, which three-point linkage can be attached to the front or the rear of the vehicle. It is also well known to provide a further hydraulic cylinder to serve as the top link of a three point linkage and/or a hydraulic cylinder to be provided on an trailed implement to assist with weight transfer of the implement to the tractor, these top link cylinders or hydraulic cylinders provided on a trailed implement will be referred to as upper cylinders thereby differentiating them from the aforementioned lift cylinders.

These hydraulic cylinders (also called lifting cylinders and/or top link cylinders and/or upper cylinders) conventionally comprise a cylinder body which is formed like a tube, with a cylinder base on one end and a cylinder piston moving within the cylinder body. The cylinder piston is fixed to a piston rod extending through a cylinder head for connection with parts to be moved. The cylinder piston, cylinder body and the cylinder base form a first chamber, also called the piston side (or piston side chamber). The cylinder piston, cylinder body and the cylinder head (through which the rod extends) form a second and opposite chamber, also called the ring side (or annulus side chamber).

Each chamber can be connected to a hydraulic supply system, either on the pressure generating pump side or the pressure discharging tank side, with a control system operating the cylinder in single-acting or double-acting mode.

In general a linkage control system is required to provide four modes:
1. A raising mode to lift the linkage
2. A lowering mode to lower the linkage
3. Floating position allowing free movement of the linkage
4. Locked/NEUTRAL position (typically for driving on the road)

Depending on the installation of the lifting cylinder, the raising mode may be provided by pressurizing the ring side of the lifting cylinder (which is common for a three-point linkage attached to the front) or by pressurizing the piston side (which is common for a rear three-point linkage).

A further desirable mode is a relief pressure mode. Relief pressure systems are provided to take part of the weight load of an attached implement that runs on the soil surface, whereby the implement can follow the ground contours but does not impact the soil too excessively. This is advantageous for certain types of mounted agricultural implement, especially for fully-mounted front mowers and can be used to transfer weight of the implement to the rear wheels of the tractor.

Figure 1:
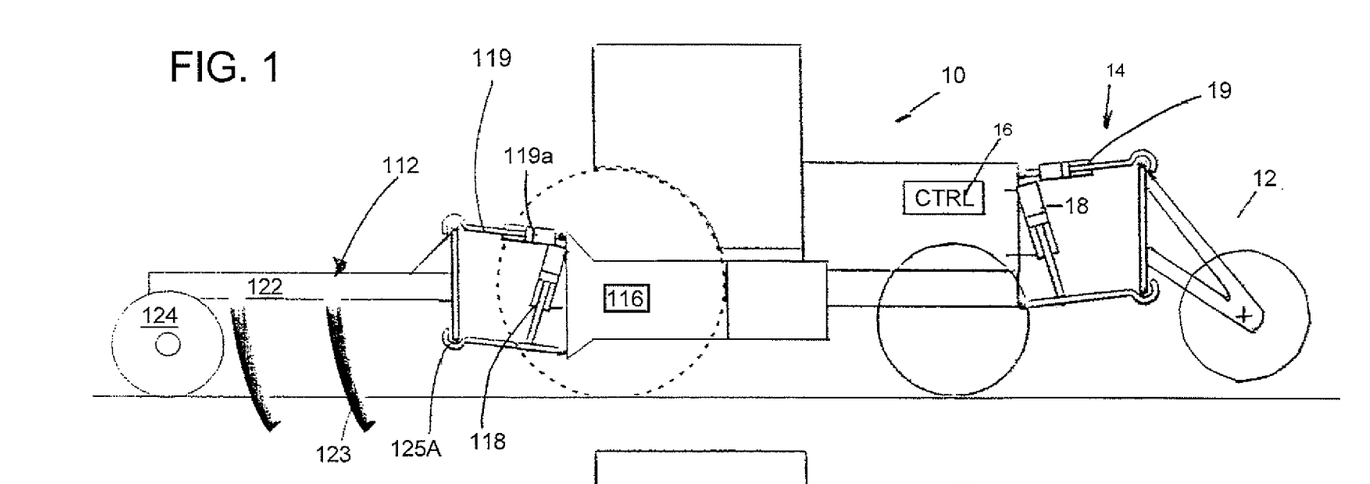
FIG. 1 schematically represents a farm tractor with an implement mounted on a hydraulically adjustable front linkage and a further implement mounted on a hydraulically adjustable rear linkage.

The relief pressure mode is mainly used with implements that are fully mounted to the three-point-linkage system such as implement 12 in FIG. 1. In this mode, the lower link cylinder are provided with pressure control. The main purpose is to actively pressurize the cylinder chamber which is used for raising the implement. By doing so, part of the weight of the implement is taken so that excessive ground contact is avoided while the implement still can follow the ground on undulated field. This is especially relevant for mowing, where ground contact would whirl dust into the fodder. On the other hand, if the opposite side of the cylinder is provided with pressure control, the implement may be forced into ground.

A relief pressure system basically works by adjusting a defined pressure on one side of a lifting cylinder (generally the side for lifting). This defined pressure results in a defined force in an upwards direction so that effective weight is taken from the implement and transferred to the tractor or other vehicle to which the implement is mounted. This provides an additional benefit in terms of improved traction and steering control.

In practice, the implement is laid down on a weighing machine (for trucks). A certain weight is shown. The operator can then adjust the pressure so that the weight shown on the weighing machine is decreased to a certain value. This has to be done once to get a reference which may then be corrected depending on current soil/harvest conditions.

Such a relief pressure system is available on the Fendt™ 700 series of tractors produced by AGCO GmbH in Marktoberdorf, Germany. A hydraulic circuit for such a system is described below with reference to FIG. 2 of the accompanying drawings.

A further desirable mode is a down pressure mode. Down pressure systems are provided to apply a downwardly directed force to an attached implement. This is advantageous for certain types of mounted agricultural implement, especially for front furrow packers which are slightly compacting soil before a rear mounted seeder lays the seeds.

Figure 4:
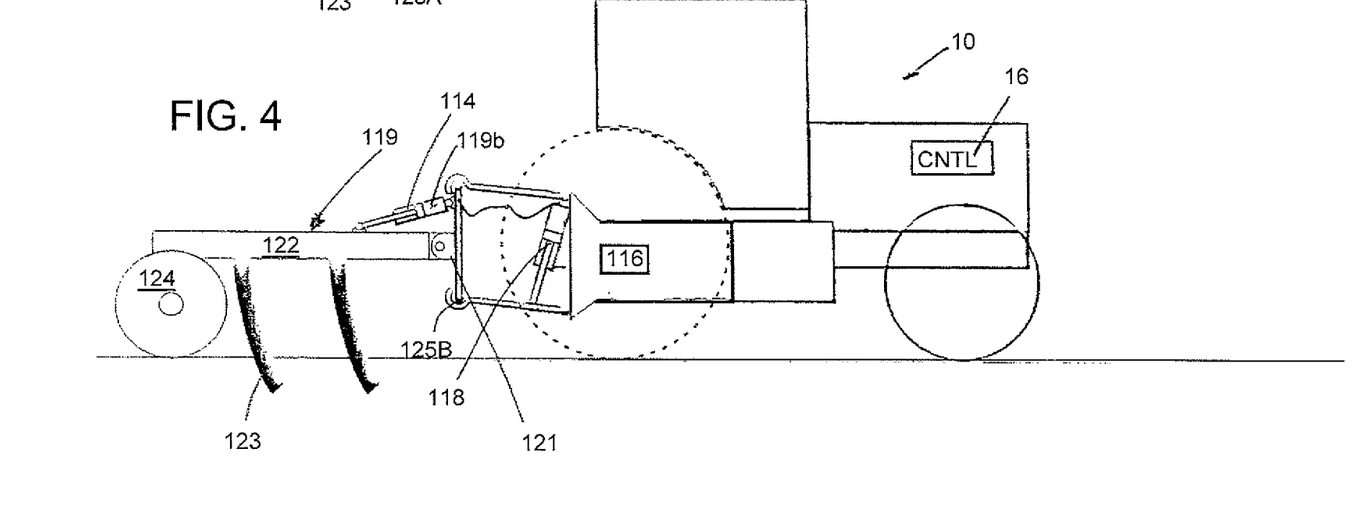
FIG. 4 schematically represents a farm tractor with an implement mounted on a hydraulically adjustable rear linkage, the implement including an upper cylinder hydraulically connected to and controlled by the tractor

Yet another desirable mode is a traction support mode. A traction support mode tries to overcome problems which occur with implements which are used for soil working, especially implements which are semi-trailed (Shown in the rear in FIG. 1 and FIG. 4) whereby semi-trailed means that the implement is connected to the three-point-linkage but has its own ground contacting wheel. This type of attachment results in that different forces are exerted on the complete system, which result in that the load on the wheels of the tractor being influenced for instance the rear wheels or the front wheels of the tractor may be lifted thereby reducing tractive capability of those wheels. Having the pressure controlled top link as shown in FIG. 1 as upper link 119 or a pressure controlled cylinder on the implement as shown in FIG. 4 as upper cylinder 119, can help to balance the forces for traction improvement. The implements shown in the rear of FIGS. 1 and 4 show the same behaviour, while in FIG. 1 the pressure control is provided for the top link, and in FIG. 4 the pressure control is provided for a cylinder which is mounted on the implement, as both the implement mounted cylinder and the top link cylinder can be used to control the traction of the tractor in the same way, they are collectively known as upper cylinders.

In each mode; traction support mode, relief pressure mode and down pressure mode, work by adjusting a pressure on one side of a lifting cylinder or upper cylinder so that term relief pressure mode or relief pressure is used for the modes throughout this patent application.

OVERVIEW OF THE INVENTION

In accordance with a first aspect of the present invention there is provided a hydraulic circuit comprising: a first lift cylinder having a piston separating first and second side chambers; a tank providing a fluid reservoir; a variable displacement pump connected to draw fluid from the tank and having a mechanism to vary the pump displacement in response to a received load-sensing signal; a linkage control valve (38) coupled to receive pressurised fluid output from the pump and operable to output the same to one of the first lift cylinder first and second side chambers via respective first and second supply lines, and further coupled to deliver a load-sensing signal to the pump; at least one switch valve (48, 49) operable to couple the first lift cylinder first side chamber to the tank; a relief pressure control valve (50) having a first position providing a connection between the pump output and the first lift cylinder second side chamber, and a second position providing a connection between the first lift cylinder second side chamber and the tank, with a further connection carrying an indication of the pressure in the first lift cylinder second side chamber as a load-sensing signal to the variable displacement pump; a feed line; an upper cylinder having a piston separating first and second side chambers, wherein the feed line is in fluid communication with the first side chamber of the top link cylinder and the relief pressure control valve and is downstream of the relief pressure control valve; and a return line providing fluid communication between the second side chamber of the upper cylinder and the tank.

Advantageously, weight transfer of an implement to the tractor can be controlled using feedback in the hydraulic circuit operating either the lift cylinders or upper cylinders of a front and or rear linkage or upper cylinder on a trailed implement.

The present invention further provides a utility vehicle including such a hydraulic circuit.

Further features of the invention are recited in the attached sub-claims, to which reference should now be made.

BRIEF DESCRIPTION OF THE DRAWINGS

Embodiments of the invention will now be described, by way of example only, and with reference to the accompanying drawings in which.

DETAILED DESCRIPTION OF THE INVENTION

FIG. 1 shows an agricultural vehicle 10 in the form of a farm tractor carrying a first implement 12 (in this case a ring press) by means of a front hitch 14. A hydraulic circuit 16 includes a lift cylinder 18 and a front top link cylinder 19 (also known as upper cylinder), each of the lift cylinder 18 and upper cylinder 19 can be controllably supplied with fluid to piston or ring side to provide the four modes (raising, lowering, floating, locked) described previously—also known as NORMAL operation. Where the front hitch 14 is of conventional three-point linkage type, having a single upper link and a connected pair of lower links each pivotably attached to the vehicle 10, each of the lower links may be raised and lowered by respective ones of a pair of lift cylinders 18. In such a case the two hydraulic lift cylinders are connected in parallel, that is to say the two piston side chambers are in fluid communication, as are the two ring side chambers. The upper cylinder 19 is operable to adjust the orientation of the implement 12.

The agricultural vehicle 10 is also carrying a rear implement 112 (in this case a plough) by means of a rear hitch 114. The rear implement 112 comprises of a main frame 122 which is rigidly connected to the rear three-point-linkage. The main frame also carries soil engaging means 123 such as plough shares. A ground wheel 124 (or wheels) are also attached to main frame 122 the implement may include some height adjusting means for depth control which is provided in combination with lower link position control. As shown, top link cylinder 119a can be controlled in terms of pressure and as will be described. The top link cylinder 119a is operable (through extension and retraction) to pivot the rear implement 112 about horizontal transverse pivot 125a.

A hydraulic circuit 116 includes a hydraulic lift cylinder 18 controllably supplied with fluid to piston or ring side to provide the four modes (raising, lowering, floating, locked) described previously—also known as NORMAL operation. Where the rear hitch 114 is of conventional three-point linkage type, having a single upper link, and a connected pair of lower links each pivotably attached to the vehicle 10, each of the lower links may be raised and lowered by respective ones of a pair of hydraulic lift cylinders 18. In such a case the two lift cylinders are connected in parallel, that is to say the two piston side chambers are in fluid communication, as are the two ring side chambers. The upper link, as has been described previously, is in this example a hydraulic cylinder 119a (also known top link cylinder) which is operable to adjust the ground engagement of the attached implement 112.

In FIG. 4 there is shown a further type of implement 113 consisting of an attachment frame 121 for connection to rear three-point-linkage and a main frame 122 which is connected to the attachment frame 121 via a horizontal transverse pivot 125b. The main frame 122 can pivot relative to attachment frame 121. The implement 113 is pivotable about pivot 125b by the extension and retraction of an implement cylinder 119b. The main frame also carries soil engaging means 123 and ground wheels 124.

The rear three-point-linkage in FIG. 4 is shown with a rigid top link while the implement 113 is provided with a pressure controlled implement link cylinder 119b between attachment frame 121 and main frame 122

The implement link cylinder 119*b* has the same function than the top link cylinder 119*a* and front top link cylinder 19 of FIG. 1 and are each referred to as upper cylinder 19 or 119 and the function will be described later when discussing the traction support mode in further detail which is now explained by considering two operating situations.

Figure 2:
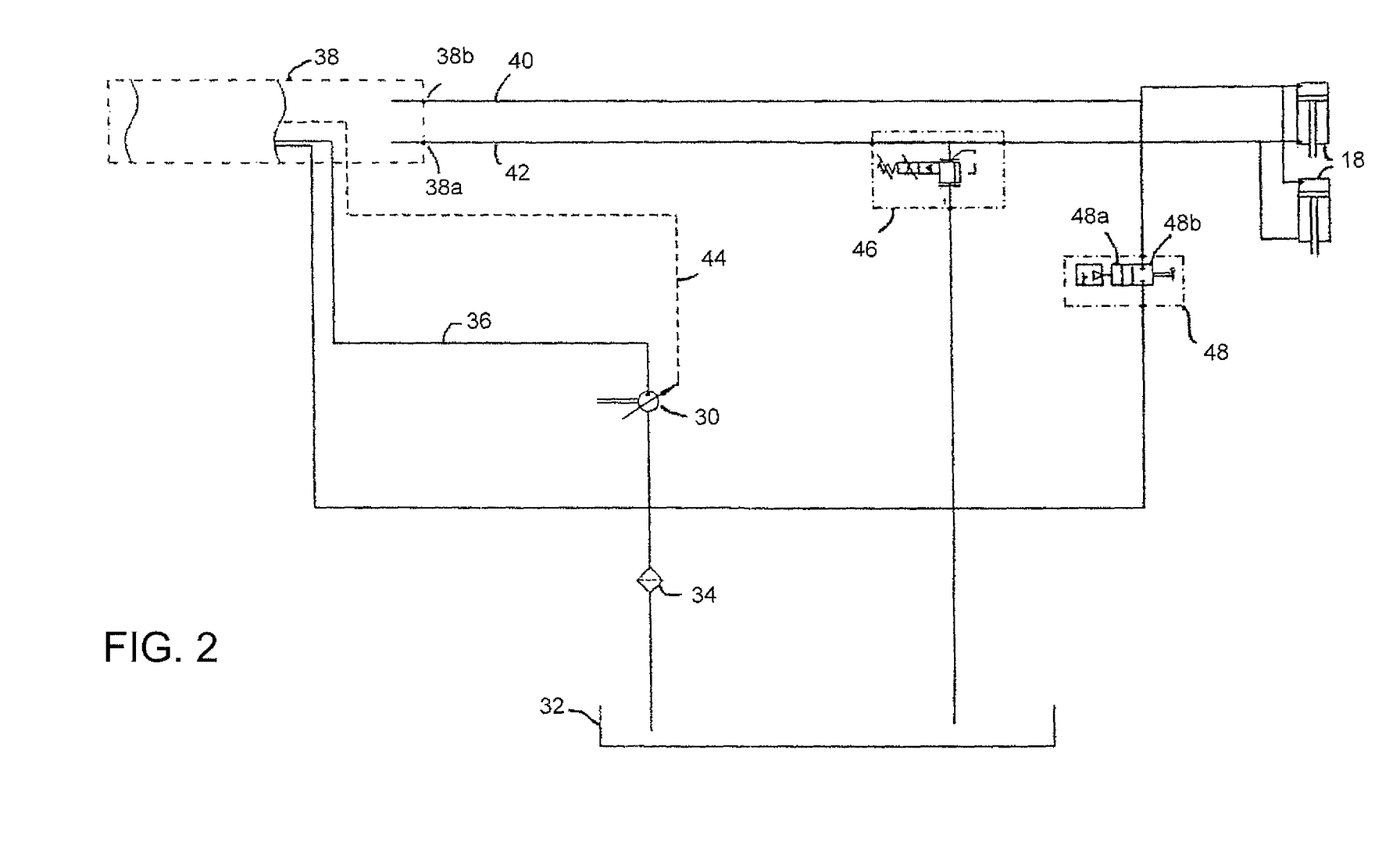
FIG. 2 is a hydraulic circuit diagram for a known relief pressure system for a hydraulically adjustable linkage.

For illustrative purposes, a known pressure relief system in a hydraulic supply system of a tractor is shown in FIG. 2. A variable displacement pump 30 draws hydraulic fluid from a tank 32, which provides a fluid reservoir, suitably via a filter 34. The pressurised fluid output from the pump 30 is carried via a line 36 to a linkage control valve 38 having first and second ports 38*a*, 38*b*. In addition to controllably delivering fluid to the hydraulic lift cylinders 18 via lines 40 and 42 as shown, the linkage control valve 38 provides a fluid supply to other consumers (not shown) on or attached to the tractor.

The linkage control valve 38 may comprise or be part of a number of interconnected valve assemblies forming a valve manifold. Such a valve manifold can be designed without internal connecting pipes or hoses and is very flexible in terms of the configurations which may be achieved. An example of such a manifold is the SB23-EHS1 Load-Sensing Control Block produced by Bosch Rexroth AG of Schwieberdingen, Germany.

Figure 3:
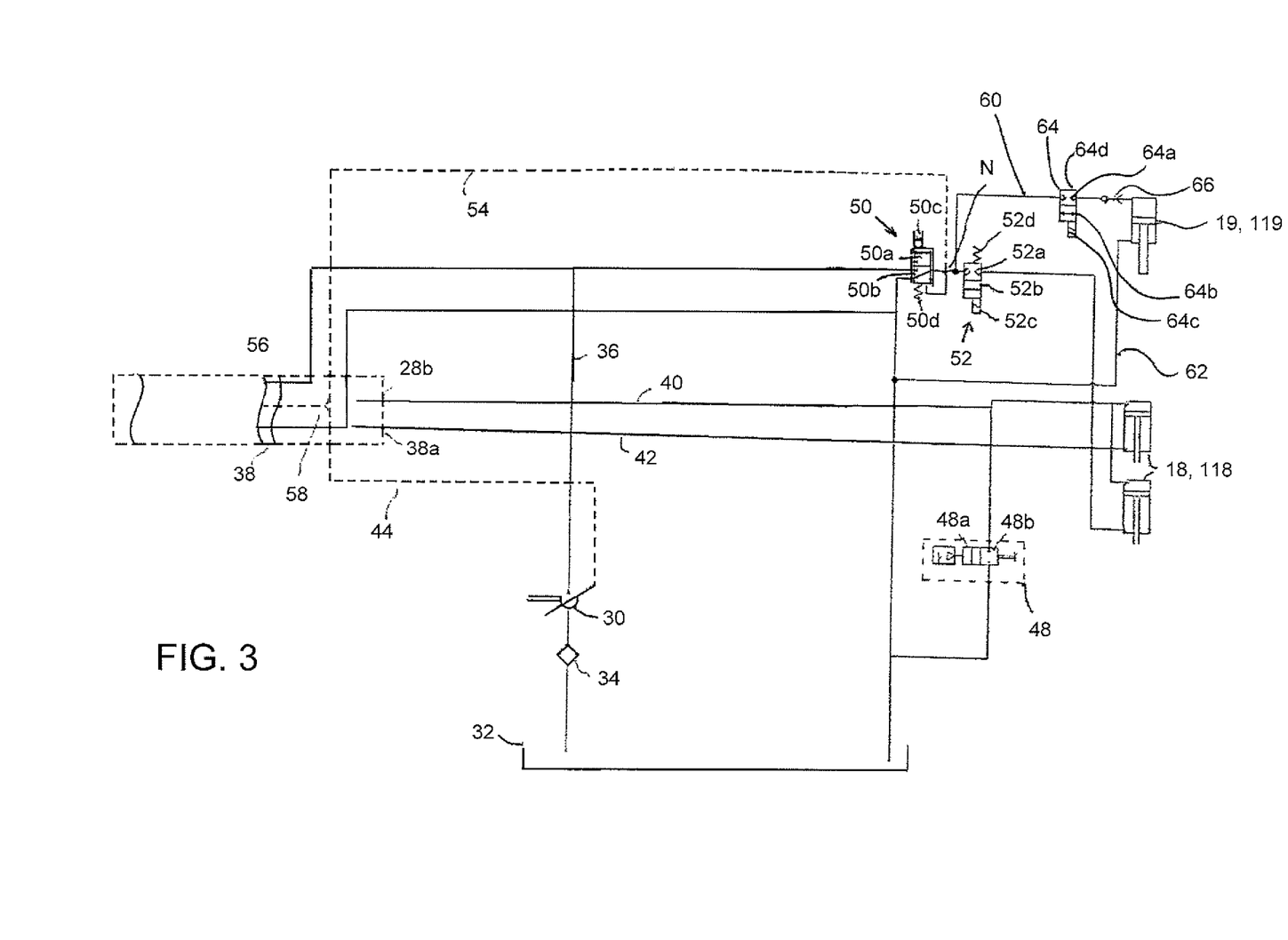
FIG. 3 is a hydraulic circuit diagram for a relief pressure system embodying the present invention.

The linkage control valve 38 may provide several positions which generally match with the above described four modes of a linkage control system and influence the status of the first ports 38*a* and second port 38*b* (the internal connection of these ports to tank, pump or blockage) and the connected lifting cylinder(s) chambers (ring side and piston side). The mode may thereby changer depending on the installation of the lifting cylinder(s) so that the position/modes of linkage control valve 38 are described as an example with reference to FIGS. 2 and 3:

- A raising mode to lift the linkage: Port 38*a* connected to pump 30, Port 38*b* connected to tank 32
- A lowering mode to lower the linkage: Port 38*b* connected to pump 30, Port 38*a* connected to tank 32
- Floating position allowing free movement of the linkage: Port 38*a*,38*b* connected to tank 32

With regard to the NEUTRAL position, linkage control valve 38 may offer two options:

- Locked/NEUTRAL Double acting position (further referred to as NEUTRAL-DA): Port 38*a* and 38*b* blocked.
- Locked/NEUTRAL Single acting position (further referred to as NEUTRAL-SA): Port 38*a* blocked, but Port 38*b* connected to tank 32, so that unintended lowering is prohibited but the implement can move upwards as fluid from the piston side of hydraulic lift cylinders 18 is discharged to the tank 32.

As already explained, depending on lifting cylinder installation and the assignment of the ports 38*a*, 38*b* to respective chambers of the lifting cylinder(s) the modes may provide different operation.

The linkage control valve 38 receives feedback providing indications of demand from the various connected consumers and outputs a load sensing (LS) signal on line 44 to the pump 30. The pump displacement is changed depending on the LS signal such as to meet the highest demand from any one of the consumers.

Generally the linkage control valve 38 is provided to adjust oil flow: a defined pressure level cannot be adjusted. Replacing the linkage control valve 38 by a pressure adjustable valve would negatively impact the basic function of the linkage needed for NORMAL operation, so relief pressure operation is always realized by an "add-on" valve arrangement.

Between the line 42 (connecting the linkage control valve 38 to the ring side of the hydraulic lift cylinders 18) and the tank 34 is a relief pressure valve 46.

Between the line 40 (connecting the linkage control valve 38 to the piston side of the hydraulic cylinders 18) and the tank 34 is a single-/double-acting switch valve 48. In a first position 48*a*, switch valve 48 connects line 40 to the tank 32. In a second position 48*b* (as shown), the connection from line 40 to tank 32 is open.

In relief pressure operation, firstly, the switch valve 48 is switched to single acting position 48*a* so that piston side of hydraulic cylinders 18 can discharge fluid to the tank 32. The linkage control valve 38 is then switched to raising mode, with the result that the linkage control valve 38 is constantly supplying fluid on line 42 to the ring side of hydraulic lift cylinders 18. The relief pressure valve 46 (between line 42 and the tank 32) can be adjusted to a certain pressure to set the desired weight relief. If this pressure is exceeded, the ring side is discharged to tank 30 via the relief pressure valve 46.

The necessity of single-/double-acting switch valve 48 depends on the specification of the linkage control valve 38. Generally when adjusting the pressure on one side of a hydraulic lift cylinder 18 by control of the fluid supply, the fluid in the opposite chamber must be discharged to tank. If the fluid discharge of the opposite chamber is blocked, the pressure adjustment would be prevented. So the necessity of single-/double-acting switch valve 48 depends on whether fluid of the opposite chamber can be discharged through linkage control valve 38 (internally in the valve manifold) or must be discharged external to the linkage control valve 38 which is then provided by single-/double-acting switch valve 48.

If the linkage control valve 38 is provided with the NEUTRAL Double acting position (NEUTRAL-DA) and this position is selected, switch valve 48 switched to single acting position 48*a* serves the purpose to discharge fluid from piston side of hydraulic lift cylinders 18 to the tank 32. If switch valve 48 is not be provided, fluid from the piston side of hydraulic lift cylinders 18 cannot be discharged to tank as port 38*b* is blocked in this position.

If linkage control valve 38 is provided with the NEUTRAL Singe acting position (NEUTRAL-SA) and this position is selected, fluid from piston side of hydraulic lift cylinders 18 is discharged to the tank 32 via port 38*b*.

This FIG. 2 arrangement has major drawbacks. Firstly, the linkage control valve 38 constantly attempts to raise the implement and if the pressure at the relief pressure valve 46 is exceeded, the connection to tank is opened leading to the linkage control valve 38 constantly delivering a full amount of fluid which is then discharged to tank. The LS signal to the variable displacement pump 30 is not adjusted according to the needs in relief pressure operation. This results in inefficient operation.

Furthermore, if the implement 12 is lifted by external forces (for example the ring press of FIG. 1 encounters a bump in the ground), an under-pressure occurs in the ring chamber of the hydraulic lift cylinders 18. As the ring chamber is connected to tank 32 in relief pressure operation, fluid cannot be provided so that the implement lays on the ground with full weight.

FIG. 3 illustrates a hydraulic supply system embodying the present invention.

Those components common to the known system of FIG. 2 are indicated by the same reference numerals and will not be again described.

Compared to the system of FIG. 2, in FIG. 3 the relief pressure valve 46 is omitted and instead a relief pressure control valve 50 and relief pressure switch valve 52 are provided.

Furthermore, an upper link hydraulic loop 58 is provided. The upper link hydraulic loop 58 comprises an upper cylinder 19, 119, feed line 60 and return line 62. The Feed line 60 is in fluid communication with relief pressure control valve 50 via node M which is down stream of node N and upstream of the relief pressure switch valve 52.

The feed line 60 is in fluid communication with a first side chamber of the upper cylinder 19, 119. The return line 62 fluidly connects the second side chamber of the upper cylinder 19, 119 with the tank 32. In the example shown schematically in FIG. 3, the feed line 60 includes a locking valve 64 and a coupling point 66 (such as a hydraulic port) for the connection of the upper cylinder 19, 119.

Figure 5A:
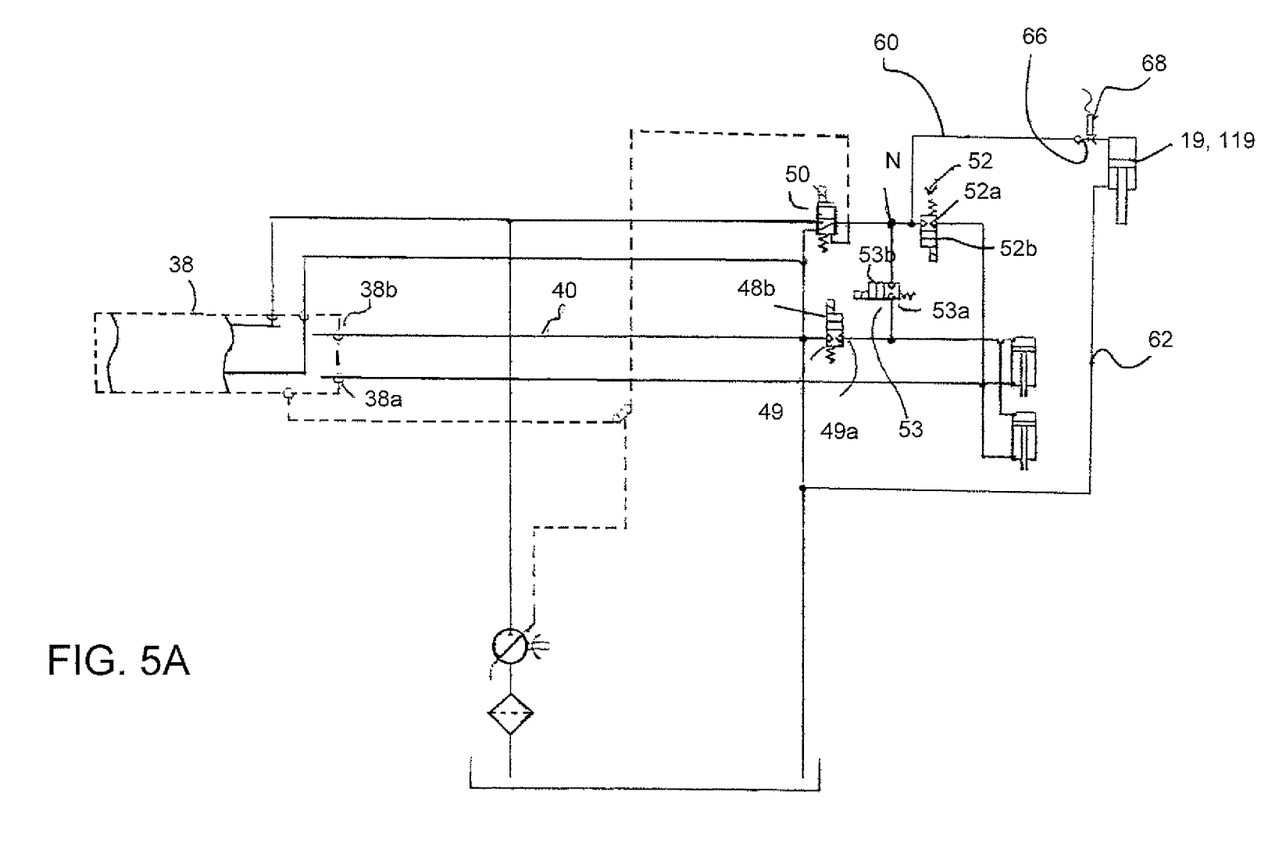
FIGS. 5A and 5B are hydraulic circuit diagrams for further embodiments of relief pressure system.
Figure 5B:
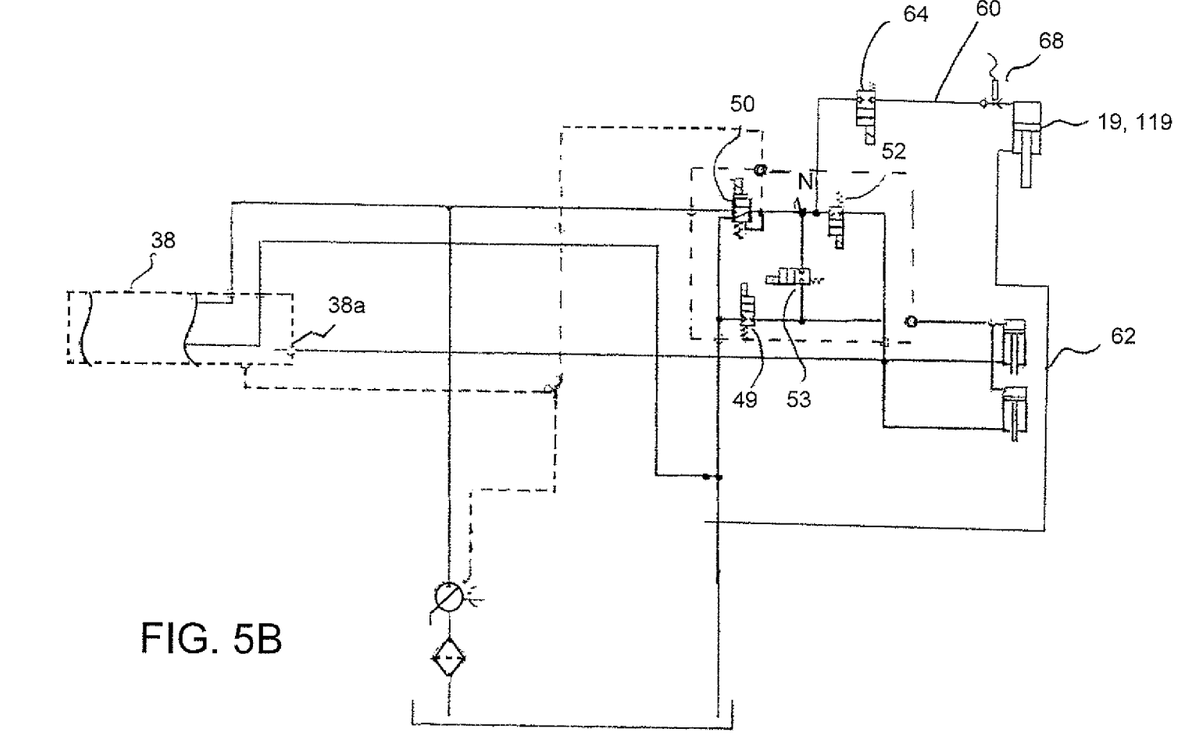

With reference to FIGS. 3, 5A and 5B, the control system is generally operable such that locking valve 64 OR relief pressure switch valve 52 is opened while the other valve is closed to avoid simultaneous supply to both the lift cylinders 18 and the upper cylinder 19, 119. This differentiates the control of an upper cylinder 19, 119 for a traction support mode from a relief pressure mode wherein the lift cylinders 18, 118 are generally operated.

In the following description of the operation of the hydraulic supply system in a relief pressure mode, locking valve 64 is in a closed position i.e. no flow is permitted as indicated by the position 64a.

Considering a node N on a line between the control valve 50 and switch valve 52, in a first position 50a the control valve 50 connects N to the pump output on line 36, and in a second position 50b connects N to the tank 32. In a first position 52a the switch valve 52 is closed and in a second position 52b the switch valve 52 connects N to the ring chambers of the hydraulic lift cylinders 18. The relief pressure control valve 50 is switched to position 50a by a solenoid 50c opposed by both a spring 50d and the pressure at N. The switch valve 52 is also operated by a solenoid 52c against a spring 52d, which spring 52d urges the valve to the closed position 52a.

The pressure at the node N is fed back on line 54 as an LS signal to the linkage control valve 38. Within the control valve 38, a further LS line 56 carries a further LS signal from one or more connected consumers. A shuttle valve 58 within the control valve 38 ensures that the highest load sensing signal is forwarded on line 44 for adjustment of the pump 30.

The linkage control valve 38 provides the same functionality as in the FIG. 2 embodiment. In NORMAL operation, relief pressure control valve 50 and relief pressure switch valve 52 are in the positions shown (50b, 52a) so that node N and the LS line 54 are always connected to tank 32. By that, only the LS signal on line 58 coming from other consumers coupled to the linkage control valve 38 is forwarded to adjust pump pressure during NORMAL operation.

For relief pressure operation, firstly, linkage control valve 38 is switched to one of the NEUTRAL modes, NEUTRAL-DA or NEUTRAL-SA. Similar to the system illustrated in FIG. 2, if the linkage control valve 38 is provided with the NEUTRAL Double acting position (NEUTRAL-DA) and this position is selected, switch valve 48 must be provided to discharge fluid from piston side of hydraulic lift cylinders 18 to the tank 32. Therefore, the single-/double-acting switch valve 48 is switched to single acting position 48a as with the FIG. 2 solution.

If linkage control valve 38 is provided with the NEUTRAL Single acting position (NEUTRAL-SA) and this position is selected, fluid from piston side of hydraulic lift cylinders 18 is discharged to the tank 32 via port 38b so that switch valve 48 can be omitted.

Next, the relief pressure switch valve 52 is opened (position 52b) to connect the ring chambers of hydraulic lift cylinders 18 to node N and hence to relief pressure control valve 50. The relief pressure control valve 50 can then adjust the pressure on the ring side of the linkage cylinders 18 (in position 50a). The solenoid 50c of relief pressure control valve 50 acts against the spring 50d (typical setting 5 bar) and the ring side pressure from N. If the adjusted pressure is reached relief pressure control valve 50 opens to tank 32 (position 50b).

The load pressure (on the ring side of cylinders 18 and at node N) is forwarded to the LS line 54 to adjust pump 30. Suitably the default pressure differential of the load sensing pump 30 is set to 20 bar (the pump always supplies a pressure +20 bar compared to the request via LS line 44), and the same pressure difference is provided at relief pressure control valve 50 making the system very responsive.

This arrangement provides some major advantages compared to current solution, the first of which is that there is no constant oil flow discharged to tank for relief pressure operation. The pressure setting for relief pressure control valve 50 is forwarded to LS branch 54, 44 for pump adjustment giving LS control in relief pressure operation. Furthermore, as before, if the implement is lifted by external forces (e.g. a bump), an under-pressure occurs in the ring chamber of the hydraulic lift cylinders 18 and/or top cylinder 19. However, as the ring side pressure falls, relief pressure control valve 50 is moved to position 50a for connection to pump receiving oil flow on line 36 so that pressure setting can be reached again. Even if, in that case, the LS line does not forward any pressure to control the pump 30, the default pressure differential of the pump (20 bar) ensures that the relief pressure is rising again (resulting in LS signal generation).

When in traction support mode the relief pressure switch valve 52 is closed i.e. in first position 52a.

In the following description of the operation of the hydraulic supply system in a relief pressure mode, switch valve 52 is in a closed position i.e. no flow is permitted as indicated by the position 52a.

Considering node N on the line between the control valve 50 and locking valve 64 via node M, as previously described, in the first position 50a the control valve 50 connects N to the pump output on line 36, and in the second position 50b connects N to the tank 32.

In a first position 64a the locking valve 64 is closed and in a second position 64b the locking valve 64 connects N to the ring chambers of the upper cylinders 19, 119. The relief pressure control valve 50 is switched to position 50a by a solenoid 50c opposed by both a spring 50d and the pressure at N. The locking valve 64 is also operated by a solenoid 64c against a spring 64d, which spring 64d urges the valve to the closed position 64a.

As with the pressure relief mode, the pressure at the node N is fed back on line 54 as an LS signal to the linkage control valve 38. Within the control valve 38, a further LS line 56 carries a further LS signal from one or more connected consumers via the shuttle valve 58 within the control valve 38 for adjustment of the pump 30.

The linkage control valve 38 provides the same functionality as in the FIG. 2 embodiment. In NORMAL operation, relief pressure control valve 50 and locking valve 64 are in the positions shown (50*b*, 64*a*) so that node N and the LS line 54 are always connected to tank 32. By that, only the LS signal on line 58 coming from other consumers coupled to the linkage control valve 38 is forwarded to adjust pump pressure during NORMAL operation.

For relief pressure operation, firstly, linkage control valve 38 is switched to one of the NEUTRAL modes, NEUTRAL-DA or NEUTRAL-SA. Similar to the system illustrated in FIG. 2, if the linkage control valve 38 is provided with the NEUTRAL Double acting position (NEUTRAL-DA) and this position is selected, switch valve 48 must be provided to discharge fluid from piston side of upper cylinders 19, 119 to the tank 32. Therefore, the single-/double-acting switch valve 48 is switched to single acting position 48*a* as with the FIG. 2 solution.

If linkage control valve 38 is provided with the NEUTRAL Single acting position (NEUTRAL-SA) and this position is selected, fluid from piston side of upper cylinders 19, 119 is discharged to the tank 32 via port 38*b* so that switch valve 48 can be omitted.

Next, the relief locking valve 64 is opened (position 64*b*) to connect the ring chambers of upper cylinders 19, 119 to node N via node M and hence to relief pressure control valve 50. The relief pressure control valve 50 can then adjust the pressure on the ring side of the upper cylinders 19, 119 (in position 50*a*). The solenoid 50*c* of relief pressure control valve 50 acts against the spring 50*d* (typical setting 5 bar) and the ring side pressure from N. If the adjusted pressure is reached relief pressure control valve 50 opens to tank 32 (position 50*b*).

The load pressure (on the ring side of upper cylinders 19, 119 and at node N) is forwarded to the LS line 54 to adjust pump 30.

This arrangement has similar advantages to that discussed in relation to the relief pressure mode. Moreover, In a first operation, the implements 112, 113 are used where the ground engaging means 123 apply a vertical force in upwards direction (as the plough or a cultivator roller is pushed out of ground).

As this force acts between the implement ground wheel 124 and the rear wheel of the tractor (with the front wheel being the third point of contact), a jack-knife effect occurs which lifts the rear wheels of the tractor. When this happens, the rear wheels may lose tractive capability.

As a countermeasure, pressure controlled upper cylinders 119 can be retracted with controlled pressure so that the jack-knife effect is overcome and rear wheels are pushed on the ground to regain their tractive capability.

In the case of implement 12 which is front mounted, the front wheels of the tractor may be lifted due to the vertical force in an upwards direction (as opposed to the rear wheels described above) being applied to the implement 12. This may cause a decrease in steering control and/or loss of front wheel traction in AWD vehicles. To counter this upper cylinder 19 can be retracted.

In a second operation, the implements 112, 113 are used where the ground engaging means 123 apply a vertical force in downwards direction (as though the plough were being pulled into ground). Here the jack-knife effect results in that the front wheels of the tractor are lifted and therefore lose their tractive capability (when driven in a AWD vehicle).

As a countermeasure, pressure controlled cylinders 119 can now be extended with controlled pressure so that the jack-knife effect is overcome and front wheels are pushed on the ground to regain their tractive capability.

Again, in the case of implement 12 which is front mounted, the rear wheels of the tractor may be lifted due to the vertical force in a downwards direction on the implement 12 (as opposed to the front wheels described above). This may cause loss of rear wheel tractive capability. To counter this upper cylinder 19 can be extended.

Further operating conditions may be possible where the target is to balance the wheel loads of the tractor wheels and the ground engaging wheels of the implement) to avoid excessive soil compaction under the overloaded wheel(s). Dependent of the force applied by the implement and its soil engaging means, the pressure controlled cylinders 19, 119 may be retracted or extended for balancing. A control system may be provided which is able to determine wheels loads, vertical loads in the linkage, tractive forces on the wheels etc. for controlling the pressure applied.

Furthermore, depending on the geometric design of the implement and the installation of the upper cylinder 19, 119, the cylinder may be retracted or extended showing the same effect in terms of force balancing.

Although the foregoing embodiment is a front hitch arrangement for a tractor, it will be recognised that the present invention is not so limited. Especially the installation of the lifting cylinder in the vehicle can vary so that ring side or piston side must be pressurized to e.g. provide the raising mode to lift the linkage.

The foregoing embodiments describe a solution for providing a relief pressure control (which means that the force applied is directed upwards). Turning now to FIGS. 5A and 5B, it is envisaged that a down pressure system may be provided by providing the same valve arrangement in the branch of the other chamber of hydraulic lift cylinder 18.

If there is the additional need for a relief pressure (=down pressure) control for the piston chamber of the hydraulic lift cylinder 18, additional down pressure switch valve 53 (which works in exactly the same way as relief pressure switch valve 52) and further switch valve 49 (which works exactly the same way as single-/double-acting switch valve 48) is provided. This arrangement of FIG. 5A may be used to provide down pressure to operate e.g. a front furrow packer.

If the system is operating in the relief pressure mode wherein ring side pressure is adjustable, relief pressure switch valve 52 is switched to opened position (position 52*b*) to connect the ring chambers of hydraulic lift cylinders 18 to node N and hence to relief pressure control valve 50. The relief pressure control valve 50 is then provided to adjust the pressure on the ring side of the hydraulic lift cylinders 18 (in position 50*a*). This is the same as explained with reference to FIG. 3. In addition, down pressure switch valve 53 would be kept in closed position 53*a* to avoid that fluid from piston chamber would be discharged towards node N causing a hydraulic short circuit. Additionally, further switch valve 49 is in opened position 49*a* to discharge fluid from piston chamber to tank 32. In this relief pressure control mode, linkage control valve 38 would be switched to NEUTRAL-DA or NEUTRAL-SA wherein Port 38*a* is blocked (to avoid discharge of piston side). The status of port 38*b* can be blocked or connected to tank 32.

If the system is operating in the down pressure mode wherein piston side pressure is adjustable, relief pressure switch valve 52 would be switched to closed position (position 52*a*). Furthermore linkage control valve 38 would be switched to Floating position wherein Ports 38*a*, 38*b* are both connected to tank 32. In addition, down pressure switch valve 53 would be switched to opened position 53b to connect the piston side to node N and hence to relief pressure control valve 50. In parallel, switch valve 49 is switched in closed position 49b to avoid fluid discharge from piston chamber to tank 32 The relief pressure control valve 50 can then adjust the pressure on the piston side of the hydraulic lift cylinders 18 (in position 50a).

In the embodiment shown in FIG. 5A, a connector sensor 68 is provided on the coupling point 66 to detect the connection to this coupling point. In this embodiment, the control system keeps relief pressure switch valve 52 closed, so that only the top cylinder is supplied with fluid to provide weight transfer control.

A warning may be generated to inform the operator that to operate the system in relief pressure mode (to open relief pressure switch valve 52), the upper cylinder 19, 119 must be disconnected from the top cylinder/weight transfer control coupling point 66 and connected to a standard port (not linked with relief pressure supply) but connected to a main valve similar to 38 to operate the top cylinder 19 independently of lift cylinder 18.

Regarding FIG. 5B, this is a further embodiment just differing in that the linkage control valve 38 is now single acting so that port 38b is not connectable to hydraulic lift cylinder 18. As a consequence line 40 is not necessary. In terms of functionality regarding valve 28 and the necessity of valve 49, there is no difference. For relief pressure control, linkage control valve 38 must be in NEUTRAL position so that port 38a is blocked. For down pressure mode linkage control valve 38 must be in floating position.

In the embodiment of FIG. 5B both the locking valve 64 and connector sensor 68 are provided. This arrangement provides a level of system redundancy as the system can detect the connection of top cylinder traction support control on the respective port (e.g. coupling point 66) and enable locking valve 64 to be opened while closing relief pressure switch valve 52.

In the foregoing the applicants have described a hydraulic circuit that provides relief pressure operation for a hydraulic lift cylinder 18 in an implement linkage of a utility vehicle. A relief pressure control valve 50 has a first position 50a providing a connection between a variable displacement pump 30 and one side of the hydraulic lift cylinder 18, and a second position 50b providing a connection between that side of the hydraulic lift cylinder and a drain or reservoir 32. A connection 54, 44 carries an indication of the pressure in the hydraulic lift cylinder chamber as a load-sensing signal to control adjustment of the pump 30.

From reading the present disclosure, other modifications will be apparent to persons skilled in the art. Such modifications may involve other features which are already known in the field of agricultural machines and component parts thereof and which may be used instead of or in addition to features already described herein, and the scope of the invention is limited only by the following claims.

The invention claimed is:

1. A hydraulic circuit comprising:
   a first lift cylinder having a piston separating first and second side chambers;
   a tank providing a fluid reservoir;
   a variable displacement pump connected to draw fluid from the tank and having a mechanism to vary the pump displacement in response to a received load-sensing signal;
   a linkage control valve coupled to receive pressurised fluid output from the pump and operable to output the received pressurised fluid to one of the first lift cylinder first and second side chambers via respective first and second supply lines, and further coupled to deliver the load-sensing signal to the pump;
   at least one switch valve operable to couple the first lift cylinder first side chamber to the tank;
   a relief pressure control valve having a first position providing a connection between the pump output and the first lift cylinder second side chamber, and a second position providing a connection between the first lift cylinder second side chamber and the tank, with a further connection carrying an indication of the pressure in the first lift cylinder second side chamber as the load-sensing signal to the pump;
   a feed line;
   an upper cylinder having a piston separating first and second side chambers, wherein the feed line is in fluid communication with the first side chamber of the upper cylinder and the relief pressure control valve and is downstream of the relief pressure control valve; and
   a return line providing fluid communication between the second side chamber of the upper cylinder and the tank.

2. The hydraulic circuit as claimed in claim 1, wherein the feed line includes a coupling point for the attachment of a hydraulic consumer.

3. The hydraulic circuit as claimed in claim 1, wherein a locking valve is provided on the feed line, the locking valve having a first position wherein flow is permitted in the feed line and a second position wherein flow is not permitted in the feed line.

4. The hydraulic circuit as claimed in claim 2, further comprising a sensor, wherein the sensor is operable to provide an indication when the coupling point is connected to a hydraulic consumer.

5. The hydraulic circuit as claimed in claim 1, wherein the relief pressure control valve is urged to the second position by a spring together with the fluid pressure in the first lift cylinder second side chamber, and switched to the first position by a solenoid.

6. The hydraulic circuit as claimed in claim 1, wherein the variable displacement pump mechanism is arranged to cause the pump outflow pressure to exceed the load-sensing signal by a predetermined amount.

7. The hydraulic circuit as claimed in claim 1, further comprising a relief pressure switch valve operable to open and close the connection between the relief pressure control valve and the first lift cylinder second side chamber.

8. The hydraulic circuit as claimed in claim 1, further comprising a second lift cylinder having first and second side chambers respectively in fluid communication with the first and second side chambers of the first lift cylinder.

9. The hydraulic circuit as claimed in claim 1, wherein the further connection carries the load sensing signal to the pump via the linkage control valve.

10. A utility vehicle including the hydraulic circuit as claimed in claim 1, together with a pivotably attached component raised and lowered by operation of the first lift cylinder.

11. The utility vehicle as claimed in claim 10, wherein the vehicle is an agricultural tractor and the pivotably attached component is an implement hitch.

12. The utility vehicle as claimed in claim 10, wherein the vehicle is an agricultural harvester and the pivotably attached component is a harvesting header.

* * * * *